United States Patent
Uchimura et al.

(10) Patent No.: US 10,063,823 B2
(45) Date of Patent: Aug. 28, 2018

(54) INFORMATION PROCESSING DEVICE, INFORMATION PROCESSING METHOD, PROGRAM, AND RECORDING MEDIUM

(71) Applicant: SONY CORPORATION, Tokyo (JP)

(72) Inventors: Kouichi Uchimura, Kanagawa (JP); Ryohei Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/325,779

(22) PCT Filed: Aug. 28, 2015

(86) PCT No.: PCT/JP2015/074343
§ 371 (c)(1),
(2) Date: Jan. 12, 2017

(87) PCT Pub. No.: WO2016/039171
PCT Pub. Date: Mar. 17, 2016

(65) Prior Publication Data
US 2017/0163950 A1 Jun. 8, 2017

(30) Foreign Application Priority Data

Sep. 12, 2014 (JP) .................................. 2014-185966
Oct. 23, 2014 (JP) .................................. 2014-216216

(51) Int. Cl.
*H04N 9/80* (2006.01)
*H04N 5/84* (2006.01)
(Continued)

(52) U.S. Cl.
CPC ............... *H04N 9/64* (2013.01); *G11B 20/10* (2013.01); *H04N 5/76* (2013.01); *H04N 5/85* (2013.01); *H04N 9/8205* (2013.01); *H04N 9/87* (2013.01)

(58) Field of Classification Search
CPC . G11B 20/10; H04N 9/64; H04N 9/87; H04N 9/8205; H04N 5/76; H04N 5/85
(Continued)

(56) References Cited

U.S. PATENT DOCUMENTS 6,597,468 B1 * 7/2003 Inuiya ................ H04N 1/32128
348/231.3
9,300,938 B2 * 3/2016 Atkins ..................... H04N 5/20
(Continued)

FOREIGN PATENT DOCUMENTS

JP 2012-501099 1/2012
JP 2012-085206 4/2012
(Continued)

OTHER PUBLICATIONS

Mar. 16, 2018, European Search Report issued for related EP Application No. 15840426.9.

*Primary Examiner* — Robert Chevalier
(74) *Attorney, Agent, or Firm* — Paratus Law Group, PLLC

(57) ABSTRACT

There is provided an information processing device, an information processing method, a program, and a recording medium that make it possible to set a dynamic range of an image to be reproduced. A BD-J execution unit sets a dynamic range of a screen to be reproduced. A video decoder generates a main video to be reproduced in the dynamic range set by the BD-J execution unit. The present disclosure can be applied, for example, to a reproducing device or the like that reproduces an optical disk that records an AV stream of a main video in a standard dynamic range (SDR) and an AV stream of a main video in a high dynamic range (HDR).

15 Claims, 14 Drawing Sheets

(51) Int. Cl.
*H04N 9/64* (2006.01)
*G11B 20/10* (2006.01)
*H04N 9/87* (2006.01)
*H04N 5/76* (2006.01)
*H04N 5/85* (2006.01)
*H04N 9/82* (2006.01)

(58) Field of Classification Search
USPC .......................... 386/248, 326, 332, 335, 336
See application file for complete search history.

(56) References Cited

U.S. PATENT DOCUMENTS

| 2011/0154426 | A1 | 6/2011 | Doser et al. |
| 2013/0114000 | A1 | 5/2013 | Atkins |
| 2014/0056577 | A1 | 2/2014 | Ogawa et al. |

FOREIGN PATENT DOCUMENTS

| JP | 2012-510195 | 4/2012 |
| WO | WO2012/147350 A1 | 11/2012 |
| WO | WO2013/027408 A1 | 2/2013 |
| WO | WO2013/061523 A1 | 5/2013 |

* cited by examiner

FIG. 3

| Syntax | No. of bits | Mnemonic |
|---|---|---|
| xxxxx.bdjo { | | |
|   type_indicator | 8*4 | bslbf |
|   version_number | 8*4 | bslbf |
|   TerminalInfo_start_address | 32 | uimsbf |
|   AppCacheInfo_start_address | 32 | uimsbf |
|   TableOfAccessiblePlayLists_start_address | 32 | uimsbf |
|   ApplicationManagementTable_start_address | 32 | uimsbf |
|   KeyInterestTable_start_address | 32 | uimsbf |
|   FileAccessInfo_start_address | 32 | uimsbf |
|   reserved_for_future_use | 128 | bslbf |
|   TerminalInfo() | | |
|   AppCacheInfo() | | |
|   TableOfAccessiblePlayLists() | | |
|   ApplicationManagementTable() | | |
|   KeyInterestTable() | | |
|   FileAccessInfo() | | |
| } | | |

FIG. 4

```
TerminalInfo(){
  ...
  initial_HAVi_configuration_id    4bit   bslbf   3840x2160 IN CASE OF 7
  initial_frame_rate               4bit   bslbf
  initial_dynamic_range            1bit   bslbf   SDR IN CASE OF 0, HDR IN CASE OF 1
  reserved                         25bit  bslbf
}
```

FIG. 6

1. org.blurayx.uhd.ui#HDRProperty CLASS org.blurayx.uhd.ui#HDRProperty#HDR = EXPRESSING HDR org.blurayx.uhd.ui#HDRProperty#SDR = EXPRESSING SDR 2. org.blurayx.uhd.ui#HVideoConfigurationTemplateUHD CLASS (HOWEVER, org.blurayx.ui#HVideoConfigurationTemplate CLASS IS INHERITED)

org.blurayx.uhd.ui#HVideoConfigurationTemplateUHD#DynamicRange 3. org.blurayx.uhd.ui#HGraphicsConfigurationTemplateUHD CLASS 4. org.blurayx.uhd.ui#HBackgroundConfigurationTemplateUHD CLASS

INFORMATION PROCESSING DEVICE, INFORMATION PROCESSING METHOD, PROGRAM, AND RECORDING MEDIUM

CROSS REFERENCE TO PRIOR APPLICATION

This application is a National Stage Patent Application of PCT International Patent Application No. PCT/JP2015/074343 (filed on Aug. 28, 2015) under 35 U.S.C. § 371, which claims priority to Japanese Patent Application Nos. 2014-216216 (filed on Oct. 23, 2014) and 2014-185966 (filed on Sep. 12, 2014), which are all hereby incorporated by reference in their entirety.

TECHNICAL FIELD

The present disclosure relates to an information processing device, an information processing method, a program, and a recording medium and specifically relates to an information processing device, an information processing method, a program, and a recording medium that can set a dynamic range of an image to be reproduced.

BACKGROUND ART

The Blu-ray disc association (BDA) has developed a standard for a Blu-ray (registered trademark) disc (BD). It is possible to record a main video, audio, a navigation program called Blu-ray Disc Java (registered trademark) (BD-J), and the like into BD (see, for example, Patent Document 1). By executing BD-J, a reproducing device can control reproduction of the main video or audio recorded in the BD or can generate and display graphics that is an image of a menu button, a game, or the like.

The BDA is currently developing an ultra high definition (UHD) 3D standard, in the UHD BD standard, it is discussed to perform 4 k resolution extension, high dynamic range (HDR) extension, and the like.

CITATION LIST

Patent Document

Patent Document 1: Japanese Patent Application Laid-open No. 2012-085206

SUMMARY OF THE INVENTION

Problems to be Solved by the Invention

When HDR extension is performed, it becomes possible in BD to handle images in a plurality of dynamic ranges such as a standard dynamic range (SDR) and HDR. Thus, the reproducing device needs to set a dynamic range of an image to be reproduced.

The present disclosure is provided in view of such a condition and is to make it possible to set a dynamic range of an image to be reproduced.

Solutions to Problems

An information processing device of a first aspect of the present disclosure is an information processing device including: a setting unit configured to set a dynamic range of an image to be reproduced; and a generation unit configured to generate the image to be reproduced in the dynamic range set by the setting unit.

An information processing method and a program that are the first aspect of the present disclosure correspond to the information processing device of the first aspect of the present disclosure.

In the first aspect of the present disclosure, a dynamic range of an image to be reproduced is set and the image to be reproduced in the set dynamic range is generated.

A recording medium of a second aspect of the present disclosure is a recording medium that records information instructing setting of a dynamic range of an image to be reproduced, that is mounted to an information processing device, that is reproduced, and that causes the information processing device, which acquires the information, to set the dynamic range of the image to be reproduced and to generate the image to be reproduced in the set dynamic range.

In the second aspect of the present disclosure, information instructing setting of a dynamic range of an image to be reproduced is recorded.

An information processing device of a third aspect of the present disclosure is an information processing device including: a generation unit configured to generate a file including information instructing setting of a dynamic range of an image to be reproduced.

In the third aspect of the present disclosure, a file including information instructing setting of a dynamic range of an image to be reproduced is generated.

Effects of the Invention

According to a first aspect of the present disclosure, it is possible to generate an image. Also, according to the first aspect of the present disclosure, it is possible to set a dynamic range of an image to be reproduced.

Also, according to a second aspect of the present disclosure, it is possible to generate an image. Also, according to the second aspect of the present disclosure, it is possible to set a dynamic range of an image to be reproduced.

Moreover, according to a third, aspect of the present disclosure, it is possible to generate a file. Also, according to the third aspect of the present disclosure, it is possible to generate a file including information instructing setting of a dynamic range of an image to be reproduced.

Note that effects described herein are not the limitation and may be any of the effects described in the present disclosure.

BRIEF DESCRIPTION OF DRAWINGS

FIG. 3 is a view illustrating an example of syntax of a BDJO file.

FIG. 4 is a view illustrating an example of syntax of TerminalInfo.

FIG. 6 is a view for describing extension of a class of an application programming interface (API) of BD-J.

MODE FOR CARRYING OUT THE INVENTION

In the following, a mode for carrying out the present disclosure (hereinafter, referred to as embodiment) will be described. Note that the description will be made in the following order.
1. First embodiment: recording/reproducing system (FIG. 1 to FIG. 10)
2. Second embodiment: recording/reproducing system (FIG. 11 to FIG. 13)
3. Third embodiment: computer (FIG. 14)

First Embodiment

Configuration Example of First Embodiment of Recording/Reproducing System

Figure 1:
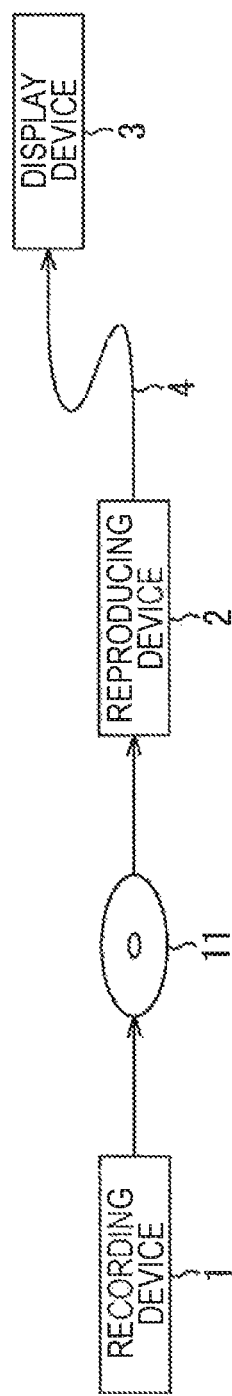
FIG. 1 is a block diagram illustrating a configuration example of a first embodiment of a recording/reproducing system to which the present disclosure is applied.

FIG. 1 is a block diagram illustrating a configuration example of the first embodiment of the recording/reproducing system to which the present disclosure is applied.

The recording/reproducing system in FIG. 1 includes a recording device 1, a reproducing device 2, and a display device 3 and can handle an image in 4 k resolution or an image in HDR. The reproducing device 2 and the display device 3 are connected to each other through a high definition multimedia interface (HDMI (registered trademark)) cable 4. The reproducing device 2 and the display device 3 may be connected to each other through a cable in a different standard or may be connected to each other through wireless communication.

The recording device 1 (information processing device) records content such as a main video, audio, and BD-J. The reproducing device 2 (information processing device) reproduces the main video or audio or generates graphics or a background image by executing BD-J. Since processing related to a background image is similar to processing related to graphics, a description thereof is arbitrarily omitted. Content is provided from the recording device 1 to the reproducing device 2 by utilization of an optical disk 11 mounted to the recording device 1 and the reproducing device 2. The optical disk 11 is a disk that records content in a format equivalent to a BD-read only memory (ROM) format.

Content may be recorded into the optical disk 11 in a format equivalent to a different format such as BD-R or BD-RE. Also, content may be provided from the recording device 1 to the reproducing device 2 by utilization of a removable medium, which is other than an optical disk, such as a memory card including a flash memory.

When the optical disk 11 is a disk of BD-ROM, the recording device 1 is a device used by an author of content. In the following, a description will be made on the assumption that the optical disk 11, into which content is recorded by the recording device 1, is provided to the reproducing device 2. However, in practice, optical disks are duplicated, on the basis of a master disk, into which content is recorded by the recording device 1, and an optical disk 11 that is one thereof is provided to the reproducing device 2.

To the recording device 1, content such as a main video in HDR, a main video in SDR, audio, or BD-J is input. By encoding and multiplexing the main video in HDR, the main video in SDR, and the audio, the recording device 1 generates an AV stream that is one transport stream (TS). The recording device 1 (generation unit) records the generated AV stream, BD-J, and the like into the optical disk 11.

The reproducing device 2 communicates with the display device 3 through the HDMI cable 4 and acquires information related to display performance of the display device 3. The reproducing device 2 specifies whether the display device 3 is a device including an HDR monitor that, is a monitor capable of displaying an HDR image or a device including an SDR monitor that is a monitor capable of displaying an SDR image only.

Also, the reproducing device 2 drives a drive and reads the AV stream recorded in the optical disk 11. The reproducing device 2 separates the AV stream into an AV stream of the main video in HDR, an AV stream of the main video in SDR, and an AV stream of the audio and performs decoding thereof.

In a case where the display device 3 includes an HDR monitor, the reproducing device 2 synthesizes a main video in HDR or SDR, which video is acquired by the decoding, and graphics in HDR or SDR, which graphics is generated by execution of BD-J, and outputs that to the display device 3. On the other hand, in a case where the display device 3 includes an SDR monitor, the reproducing device 2 synthesizes a main video in SDR, which video is acquired by the decoding, and graphics in SDR, which graphics is generated by execution of BD-J, and outputs that to the display device 3. Also, the reproducing device 2 outputs audio acquired by the decoding to the display device 3.

The display device 3 receives an image in HDR or an image in SDR, which image is transmitted from, the reproducing device 2, and displays the image on a monitor (not illustrated). Also, the display device 3 receives the audio transmitted from the reproducing device 2 and outputs the audio from a speaker (not illustrated).

Directory Structure

Figure 2:
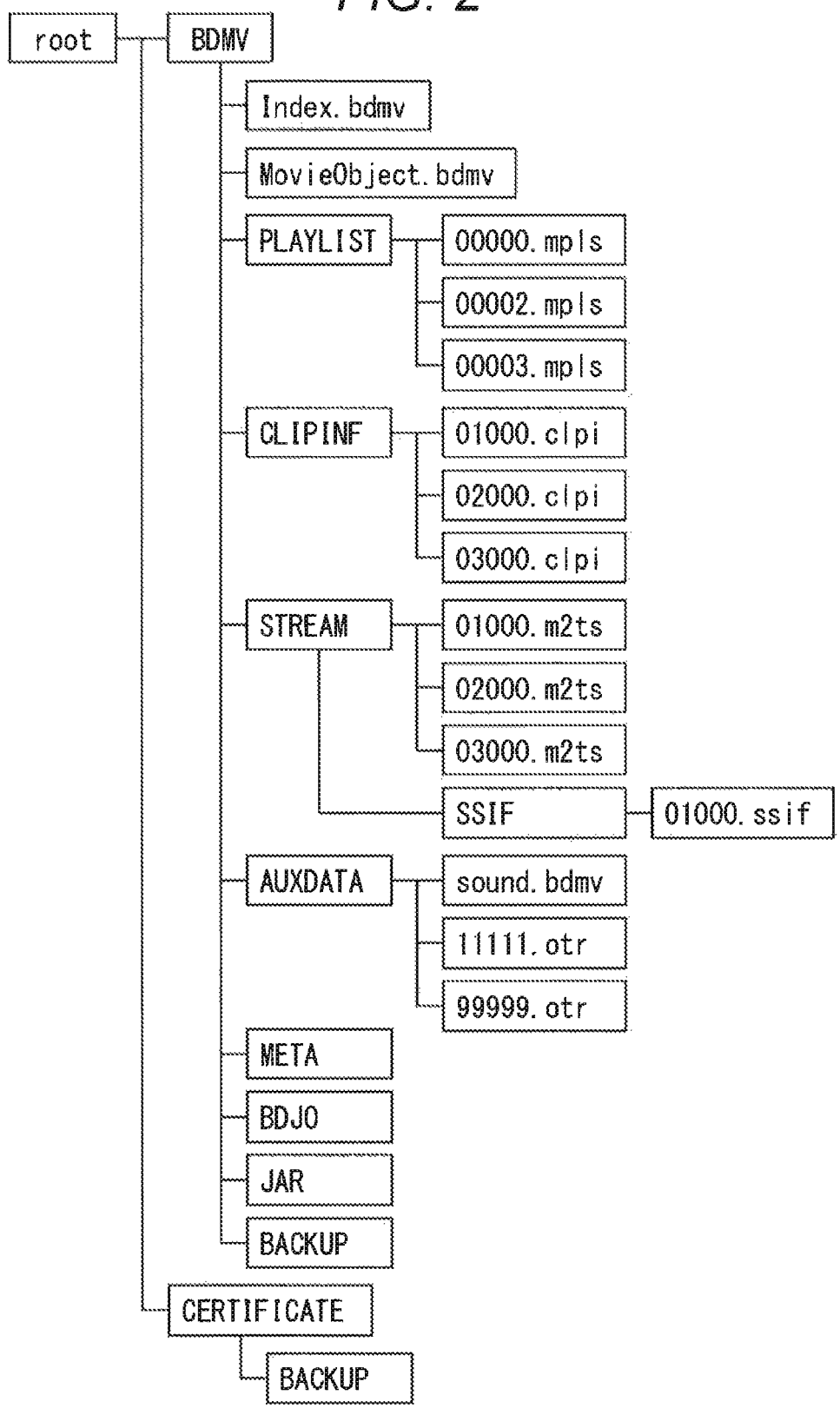
FIG. 2 is a view illustrating an example of a management structure of a file recorded in an optical disk in FIG. 1.

FIG. 2 is a view illustrating an example of a management structure of a file recorded in the optical disk 11 in FIG. 1.

Each file recorded in the optical disk 11 is managed hierarchically by a directory structure. One root directory is created on the optical disk 11.

Under the root directory, a BDMV directory, a CERTIFICATE directory, and the like are placed.

Under the BDMV directory, an index file that is a file a name of which is set to "Index.bdmv" and a Movie Object file that is a file a name of which is set to "MovieObject.bdmv" are stored.

For example, in the Index file, a list of a number of a title recorded in the optical disk 11 and a kind and a number of an object executed in accordance with the number of the title are described. As the kind of the object, there are two kinds that are a movie object (Movie Object) and a BD-J object (BD-J Object).

The movie object is an object in which a navigation command that is a command used for reproduction of PlayList, or the like is described. The BD-J object is an object in which BD-J is described. In the Movie Object file, the movie object is described.

Under the BDMV directory, a PLAYLIST directory, a CLIPINF directory, a STREAM directory, a BDJO file, a JAR file, and the like are also provided.

In the PLAYLIST directory, a PlayList file describing PlayList used as reproduction management information to manage reproduction of an AV stream is stored. To each PlayList file, a name that is a combination of a 5-digit number and an extension ".mpls" is set. A file name of "00000.mpls" is set with respect to one PlayList file illustrated in FIG. 2.

In the CLIPINF directory, information related to an AV stream in a predetermined unit is stored as a Clip Information file. To each Clip Information file, a name that is a combination of a 5-digit number and an extension ".clpi" is set. With respect to three Clip Information files in FIG. 2, file names of "01000.clpi," "02000. clpi," and "03000. clpi" are respectively set.

In the STREAM directory, an AV stream in a predetermined unit is stored as a stream file. To each stream file, a name that is a combination of a 5-digit number and an extension of ".m2ts" is set. With respect to three stream files in FIG. 2, file names of "01000.m2ts," "02000.m2ts," and "03000.m2ts" are respectively set.

A Clip Information file and a stream file, to file names of which the same 5-digit number is set, are files included in one Clip. The Clip Information file of "01000.clpi" is used in reproduction of the stream file of "01000.m2ts" and the Clip Information file of "02000.clpi" is used in reproduction of the stream file of "02000.m2ts."

The BDJO file is a static database file and describes a class of BD-J which class is to be activated initially in a corresponding title, information for specifying a JAR file of the corresponding title, and the like. The JAR file is a compressed file in which a plurality of BD-J files and the like is included.

With reference to the Index file, the reproducing device 2 specifies an object with a title to be reproduced. In a case where the object with the title to be reproduced is a BD-J object, the reproducing device 2 reads a BDJO file of the BD-J object and executes a BD-J file included in a JAR file specified by the BDJO file. Accordingly, the reproducing device 2 performs generation and displaying of graphics, reproduction of a main video or audio in accordance with PlayList, network connection, storage access, or the like.

Under the CERTIFICATE directory, a certificate certifying certainty of a signature assigned to a Jar file is stored as a CERTIFICATE file (not illustrated).

Example of Syntax of BDJO File

FIG. 3 is a view illustrating an example of syntax of a BDJO file.

As illustrated in FIG. 3, in a BDJO file (xxxxx.bdjo), TerminalInfo including an initial value of information related to a screen of a corresponding title, or the like is described.

Example of Syntax of TerminalInfo

FIG. 4 is a view illustrating an example of syntax of TerminalInfo.

As illustrated in FIG. 4, in TerminalInfo, 4-bit initial_HAVi_configuration_id expressing an initial value of resolution of a screen of a corresponding title is described. A relationship between each value of initial_HAVi_configuration_id and an initial value of resolution expressed by the value is defined by an org.blurayx.ui.DeviceConfigurations class. For example, initial_HAVi_configuration_id is 1 in a case of expressing a full high definition (FHD) of 1920× 1080, is 2 in a case of expressing a high definition (HD) of 1280×720, and is 3 in a case of expressing a standard definition (SD). Also, initial_HAVi_configuration_id is 4 and 5 respectively in a case of expressing 720×576 and 720×480 for a digital versatile disc (DVD)-video standard, and is 6 in a case of expressing a quarter high definition (QHD) of 960×540.

Also, since resolution of a screen may be 4 k resolution of 3840×2160 in the optical disk 11, 7 is newly defined as initial_HAVi_configuration_id expressing 4 k resolution of 3840×2160 in an org.blurayx.ui.DeviceConfigurations class (UHD_3840_2160=7).

Also, as illustrated in FIG. 4, in TerminalInfo, 1-bit initial_dynamic_range (initial-value information) expressing SDR or HDR is described as an initial value of a dynamic range of a screen of a corresponding title. For example, initial_dynamic_range is 0 in a case of expressing SDR, and is 1 in a case of expressing HDR.

Description of Plane

Figure 5:
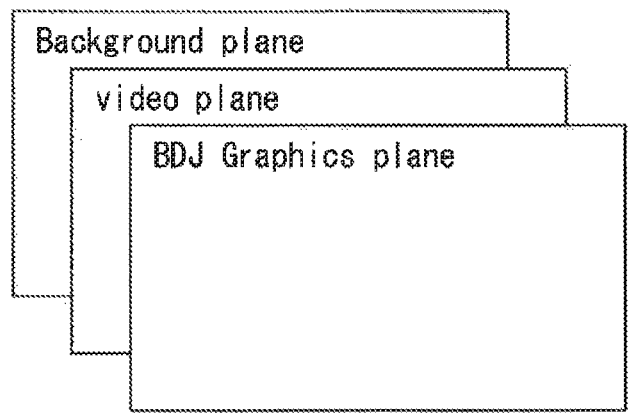
FIG. 5 is a view for describing a plane included in a screen.

FIG. 5 is a view for describing a plane included in a screen generated by execution of a BD-J file.

A screen generated by execution of a BD-J file is called HScreen. As illustrated in FIG. 5, HScreen includes a BDJ Graphics Plane, a Video Plane, and a Background Plane.

The BDJ Graphics Plane includes one screen of graphics, the Video Plane includes one screen of a main video, and the Background Plane includes one screen of a background image.

In a recording/reproducing system that cannot handle an image in HDR, reproduction of the BDJ Graphics Plane is controlled by an org.blurayx.uhd.ui#HGraphicsDevice class, an org.blurayx.uhd.ui#KGraphicsConfiguration class, and an org.blurayx.uhd.ui#HGraphicsConfigurationTemplate class of the BD-J file.

More specifically, resolution of the BDJ Graphics Plane, information expressing whether the BDJ Graphics Plane is a 2D image or a 3D image, and the like are set by the org.blurayx.uhd.ui#HGraphicsConfigurationTemplate class. Then, the information set by the org.blurayx.uhd.ui#HGraphicsConfigurationTemplate class is collected as information related to reproduction of the BDJ Graphics Plane by the org.blurayx.uhd.ui#HGraphicsConfiguration class. Then, the information collected by the org.blurayx.uhd.ui#HGraphicsConfiguration class is set as information related, to reproduction of the BDJ Graphics Plane by the org.blurayx.uhd.ui#HGraphicsDevice class.

Similarly to the reproduction of the BDJ Graphics Plane, reproduction of the Video Plane is controlled by an org.blurayx.uhd.ui#HVideoDevice class, an org.blurayx.uhd.ui#HVideoConfiguration class, and an org.blurayx.uhd.ui#HVideoConfigurationTemplate class of the BD-J file. Also, similarly to the reproduction of the BDJ Graphics Plane, reproduction of the Background Plane is controlled by an org.blurayx.uhd.ui#HBackgroundDevice class, art org.blurayx.uhd.ui#HBackgroundConfiguration class, and an org.blurayx.uhd.ui# HBackgroundConfigurationTemplate class.

On the other hand, in the recording/reproducing system in FIG. 1 which system can handle an image in HDR, the reproducing device 2 needs to set (change) a dynamic range of a screen to be reproduced or to acquire a currently-set dynamic range of a screen to be reproduced. However, by the above-described classes, it is not possible to make the reproducing device 2 execute these kinds of processing. Thus, a class of BD-J which class is necessary for execution of these kinds of processing is extended.

Extension of Class of BD-J

FIG. 6 is a view for describing extension of a class of API of BD-J which class can be handled in the recording/reproducing system in FIG. 1.

As illustrated in FIG. 6, an org.blurayx.uhd.ui#HDRProperty class is newly defined as a class of API of BD-J which class can be handled in the recording/reproducing system in FIG. 1. This org.blurayx.uhd.ui#HDRProperty class is a class expressing whether a dynamic range is SDR or HDR. Also, org.blurayx.uhd.ui#HDRProperty#HDR expresses that a dynamic range is HDR and org.blurayx.uhd.ui#HDRProperty#SDR expresses that a dynamic range is SDR.

Also, an org.blurayx.uhd.uifHVideoConfigurationTemplateUHD class is newly defined, as a class of API of BD-J which class can be handled in the recording/reproducing system, in FIG. 1. This org.blurayx.uhd.ui#HVideoConfigurationTemplateUHD class is a class that makes it possible to set a dynamic range of the Video Plane in addition to information that is related to the Video Plane and that can be seen in the org.blurayx.uhd.ui#HVideoConfigurationTemplate class.

That is, the org.blurayx.uhd.ui#HVideoCenfigurationTemplateUHD class has (inherit) a function of the org.blurayx.uhd.ui#HVideoConfigurationTemplate class. Then, in the org.blurayx.uhd.ui#HVideoConfigurationTemplateUHD class, an org.blurayx.uhd.ui#HVideoConfigurationTemplateUHD# Dynamic Range can be newly described as a property, and a setPreference(DynaraicRange,HDRProperty#HDR/#SDR,REQUIRED) function can be described.

"HDRProperty#HDR/#SDR" in setPreference(DynamicRange, HDRProperty#HDR/#SDR, REQUIRED) is set-value information expressing HDR or SDR as a set value of a corresponding plane to be reproduced. Also, "setPreference(DynamicRange, . . . , REQUIRED)" is a description instructing to set a dynamic range of a plane, which is to be reproduced, to a set value expressed, by the set-value information.

Similarly, as a class of API of BD-J which class can be handled in the recording/reproducing system in FIG. 1, an org.blurayx.uhd.ui#HGraphicsConfigurationTemplateUHD class that makes it possible to set a dynamic range of the BDJ Graphics Plane and an org.blurayx.uhd.ui#HBackgroundConfigurationTemplateUHD class that makes it possible to set a dynamic range of the Background Plane are newly defined.

In the recording/reproducing system in FIG. 1, reproduction of the BDJ Graphics Plane is controlled, by execution of BD-J described by utilization of the org.blurayx.uhd.ui#HGraphicsConfigurationTemplateUHD class instead of the org.blurayx.uhd.ui#HGraphicsConfigurationTemplate class.

More specifically, resolution of the BDJ Graphics Plane, information expressing whether the BDJ Graphics Plane is a 2D image or a 3D image, a dynamic range of the BDJ Graphics Plane, and the like are set according to a description using the org.blurayx.uhd.ui#HGraphicsConfigurationTemplateUHD class. Then, the information set according to the description using the org.blurayx.uhd.ui#HGraphicsConfigurationTemplateUHD class is collected as information related to reproduction of a BDJ Graphics Plane to be reproduced according to a description using the org.blurayx.uhd.ui#HGraphicsConfiguration class. Then, the information collected according to the description using the org.blurayx.uhd.ui#HGraphicsConfiguration class is set as information related to reproduction of a BDJ Graphics Plane to be reproduced according to a description using the org.blurayx.uhd.ui#HGraphicsDevice class. The reproducing device 2 controls reproduction of the BDJ Graphics Plane on the basis of the information related to the reproduction of the BDJ Graphics Plane to be reproduced.

Similarly, reproduction of the Video Plane and the Background Plane is controlled by execution of BD-J described by utilization of the org.blurayx.uhd.ui#HVideoConfigurationTemplateUHD class and the org.blurayx.uhd.ui#HBackgroundConfigurationTemplateUHD class.

Note that since the present technology is a technology related to an image, a description of a technology related to audio is omitted in the following.

Configuration Example of Reproducing Device

Figure 7:
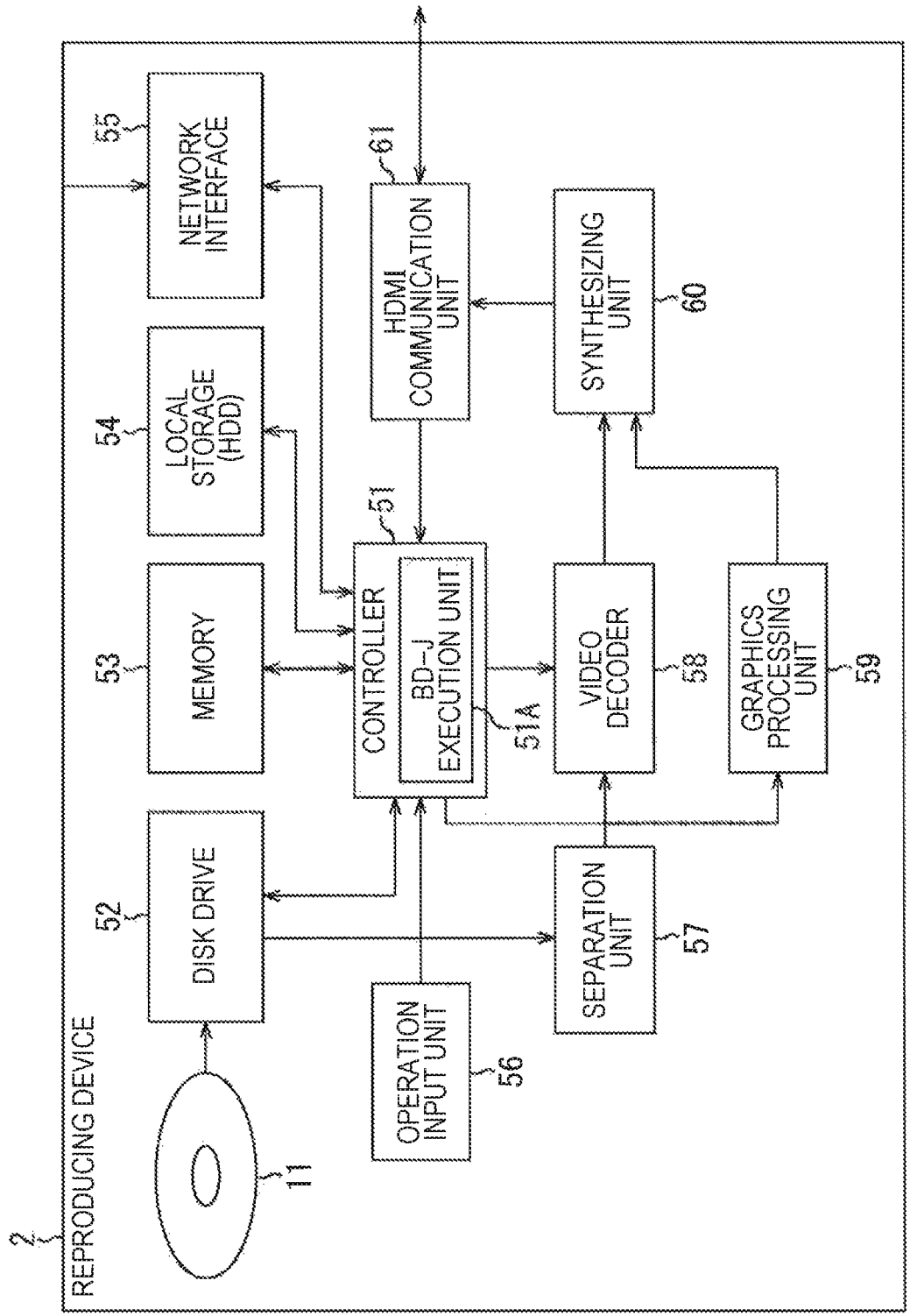
FIG. 7 is a block diagram illustrating a configuration example of a reproducing device in FIG. 1.

FIG. 7 is a block diagram illustrating a configuration example of the reproducing device 2 in FIG. 1.

The reproducing device 2 includes a controller 51, a disk drive 52, a memory 53, a local storage 54, a network interface 55, an operation input unit 56, a separation unit 57, a video decoder 58, a graphics processing unit 59, a synthesizing unit 60, and an HDMI communication unit 61.

The controller 51 includes a central processing unit (CPU), a read only memory (ROM), a random access memory (RAM), and the like. The controller 51 executes a predetermined program and controls a whole operation of the reproducing device 2 according to an operation signal or the like from the operation input unit 56.

For example, the CPU in the controller 51 functions as a BD-J execution unit 51A that reads a BDJO file in the optical disk 11 and a JAR file specified by the BDJO file and that executes a BD-J file included in the JAR file. By executing the BD-J file, the BD-J execution unit 51A controls reproduction of an AV stream or generates graphics on the basis of PlayList and Clip Information that are supplied from the disk drive 52.

Also, the BD-J execution unit 51A sets an initial value, which is expressed, by initial_dynamic_range included, in TerminalInfo of the BDJO file, as a dynamic range of each plane of a screen to be reproduced and supplies and stores the value into the memory 53. In such a manner, since the initial value of the dynamic range of each plane of the screen to be reproduced is set on the bases of initial_dynamic_range, initial_dynamic_range is information instructing the setting of the initial value of the dynamic range of each plane of the screen to be reproduced. Moreover, by executing the BD-J file, the BD-J execution unit 51A sets (change) a dynamic range stored in the memory 53.

Similarly, the BD-J execution unit 51A sets an initial value, which is expressed by initial_HAVi_configuration_id included in TerminalInfo of the BDJO file, as resolution of a screen to be reproduced and supplies and stores the value into the memory 53. Also, by executing the BD-J file, the BD-J execution unit 51A sets (change) resolution stored in the memory 53.

In the present description, it is assumed that the same dynamic range and resolution are set as dynamic ranges and resolution of a BDJ Graphics Plane, a Video Plane, and a Background Plane included in a screen to be reproduced. Thus, the memory 53 may separately store the dynamic range and the resolution as a currently-set dynamic range and resolution of the screen to be reproduced.

By executing the BD-J file, the BD-J execution unit 51A also accesses the local storage 54 or connects the network interface 55 to a network such as the Internet.

According to control by the BD-J execution unit 51A of the controller 51, the disk drive 52 reproduces and acquires a BD-J file from the optical disk 11, and outputs the file to the BD-J execution unit 51A of the controller 51. Also, according to control, by the BD-J execution unit 51A that executes the read BD-J file, the disk drive 52 reads PlayList and Clip Information from the optical disk 11 and outputs these to the BD-J execution unit 51A of the controller 51. Also, according to control by the BD-J execution unit 51A, the disk drive 52 reads an AV stream to be reproduced from the optical disk 11 and outputs the AV stream to the separation unit 57.

The memory 53 stores data such as a currently-set dynamic range and resolution of a screen to be reproduced which data is supplied from the BD-J execution unit 51A and which data, is necessary for the controller 51 to execute various kinds of processing.

The Local storage 54 includes a hard disk drive (HDD), for example. For example, the local storage 54 records data or the like supplied from the BD-J execution unit 51A, or reads the recorded data and supplies the data to the BD-J execution unit 51A.

The network interface 55 is connected to a network such as the Internet according to the control by the BD-J execution unit 51A. The network interface 55 communicates with a server through the connected network and supplies data downloaded from the server to the BD-J execution unit 51A. For example, this data is supplied and recorded into the local storage 54.

The separation unit 57 separates an AV stream of a main video in SDR and an AV stream of a main video in HDR from the AV stream supplied from the disk drive 52. The separation unit 57 outputs the separated AV stream of the main video in SDR and AV stream of the main video in HDR to the video decoder 58.

According to control by the BD-J execution unit 51A, the video decoder 58 (generation unit) decodes an AV stream of a main video in a currently-set dynamic range of a screen to be reproduced in the AV stream of the main video in SDR and the AV stream of the main video in HDR which streams are supplied from, the separation unit 57. The video decoder 58 outputs a main video in SDR or a main video in HDR which video is generated as a result, of the decoding to the synthesizing unit 60.

According to control by the BD-J execution unit 51A, the graphics processing unit 59 (generation unit) generates graphics in a currently-set dynamic range and resolution of a screen to be reproduced. The graphics processing unit 59 outputs the generated graphics in SDR or graphics in HDR to the synthesizing unit 60.

The synthesizing unit 60 synthesizes the main video in HDR, which video is supplied from the video decoder 58, and the graphics in HDR which graphics is supplied from the graphics processing unit 59. Alternatively, the synthesizing unit 60 synthesizes the main video in SDR, which video is supplied from the video decoder 58, and the graphics in SDR which graphics is supplied from the graphics processing unit 59. The synthesizing unit 60 outputs an image in HDR or an image in SDR, which image is acquired as a result of the synthesizing, to the HDMI communication unit 61.

The HDMI communication unit 61 communicates with the display device 3 through the HDMI cable 4. For example, the HDMI communication unit 61 acquires information related to performance of a monitor included in the display device 3 and outputs the information to the controller 51. Also, the HDMI communication unit 61 outputs the image in HDR or the image in SDR, which image is supplied from the synthesizing unit 60, to the display device 3.

Configuration Example of Dynamic Range Resolution Setting Unit

Figure 8:
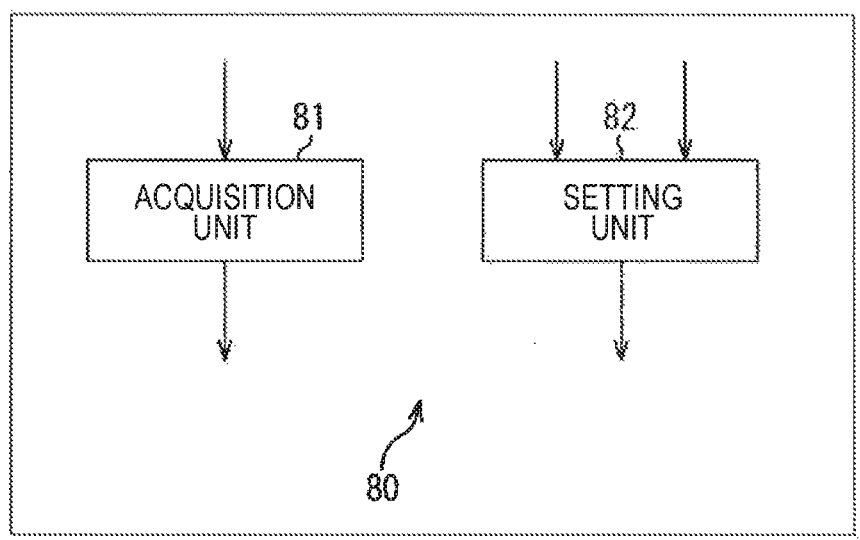
FIG. 8 is a block diagram illustrating a configuration example of a dynamic range resolution setting unit.

FIG. 8 is a block diagram illustrating a configuration example of the dynamic range resolution setting unit that sets a dynamic range and resolution, of a screen to be reproduced and that is realized by the BD-J execution unit 51A.

As illustrated in FIG. 8, a dynamic range resolution setting unit 80 includes an acquisition unit 81 and a setting unit 82.

By executing a description of "getConfigarations( ).getPreferenceObject(DynamicRange)" instructing acquisition of a dynamic range of a screen to be reproduced, in a BD-J file, the acquisition unit 81 acquires org.blurayx.uhd.ui#HDRProperty#HDR or org.blurayx.uhd.ui#HDRProperty#SDR that expresses a dynamic range, which is stored in the memory 53, in expression of an org.blurayx.uhd.ui#HDRProperty class. The acquisition unit 81 supplies a dynamic range expressed by org.blurayx.uhd.ui#HDRProperty#HDR or org.blurayx.uhd.ui#HDRProperty#SDR to the video decoder 58 and the graphics processing unit 59.

Also, by executing a description for acquiring resolution of a screen to be reproduced in the BD-J file, the acquisition unit 81 acquires the resolution of the screen to be reproduced and supplies the resolution to the graphics processing unit 59.

The setting unit 82 recognizes a dynamic range of a monitor included in the display device 3 on the basis of information that is related to performance of the monitor included in the display device 3 and that is supplied from the HDMI communication unit 61.

The setting unit 82 acquires initial_dynamic_range included in TerminalInfo of a BDJO file of a title to be reproduced. In a case of recognizing that the monitor included in the display device 3 is an HDR monitor, the setting unit 82 sets an initial value expressed by initial_dynamic_range as a dynamic range of a screen to be reproduced on the basis of acquired initial_dynamic_range.

Also, by executing setPreference(DynamicRange, HDRProperty#HDR,REQUIRED) of the BD-J file, the setting unit 82 acquires HDRProperty#HDR and sets (change) HDR as a dynamic range of each plane to be reproduced.

That is, by executing a description that uses the org.blurayx.uhd.ui#HVideoConfiguration TemplateUHD class, the org.blurayx.uhd.ui#HGraphicsConfigurationTemplateUHD class, and the org.blurayx.uhd.ui# HBackgroundConfigurationTemplateUHD class including setPreference(DynamicRange, HDRProperty#HDR, REQUIRED) and that is included in the BD-J file, the setting unit 82 sets HDR as a dynamic range of each plane to be reproduced.

Moreover, by executing setPreference(DynamicRange, SDRProperty#SDR,REQUIRED) of the BD-J file, the setting unit 82 sets SDR as a dynamic range of each plane to be reproduced.

On the other hand, in a case of recognizing that the monitor included in the display device 3 is an SDR monitor, the setting unit 82 sets a dynamic range of a screen to be reproduced to SDR regardless of initial_dynamic_range or description contents in the BD-J file. The setting unit 82 supplies and stores the set dynamic range into the memory 53.

Also, on the basis of initial_HAVI_configuration_id included in TerminalInfo of a BDJO file of a title to be reproduced, the setting unit 82 sets an initial value, which is expressed by initial_HAVI_configuration_id, as resolution of a screen to be reproduced. Accordingly, for example, in a case where initial_HAVI_configuration_id is 7, 4 k resolution of 3840×2160 is set as resolution of the screen to be reproduced.

By executing setPreference for setting resolution of a screen to be reproduced in the BD-J file, the setting unit 82 sets (change) resolution of the screen to be reproduced. The setting unit 82 supplies and stores the set resolution of the screen to be reproduced into the memory 53.

Description of Processing by Reproducing Device

Figure 9:
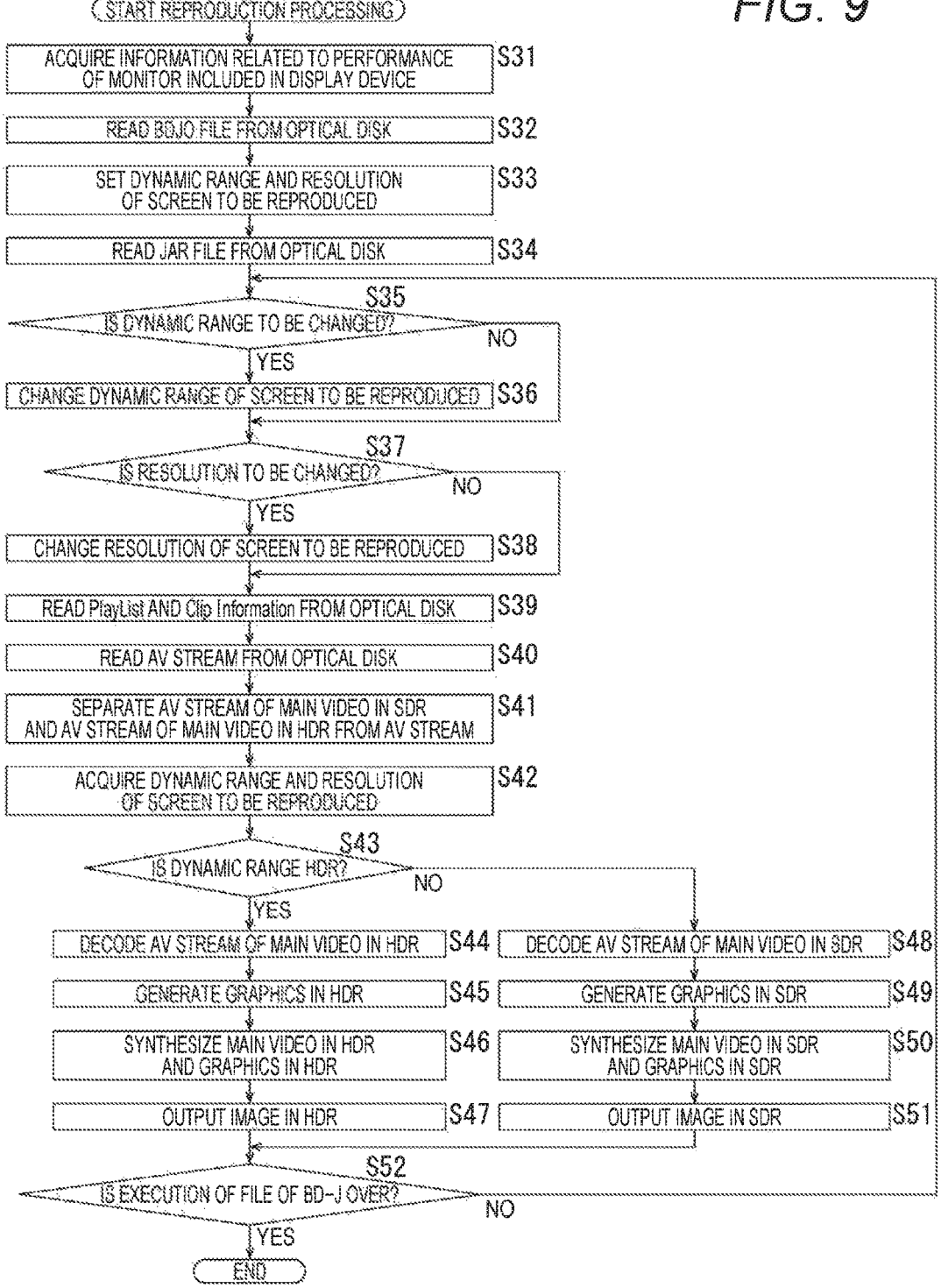
FIG. 9 is a flowchart for describing reproduction processing by the reproducing device in FIG. 7.

FIG. 9 is a flowchart, for describing reproduction processing by the reproducing device 2 in FIG. 7.

In step S31 in FIG. 9, the HDMI communication unit 61 acquires information, which is related to performance of a monitor included in the display device 3, from the display device 3 through the HDMI cable 4 and outputs the information to the controller 51.

In step S32, according to control by the controller 51, the disk drive 52 reads a BDJO file of a title to be reproduced from the optical disk 11 and outputs the file to the BD-J execution unit 51A.

In step S33, the setting unit 82 of the BD-J execution unit 51A (FIG. 8) sets a dynamic range, which is expressed by initial_dynamic_range of TerminalInfo of the BDJO file supplied from the disk drive 52, as a dynamic range of a screen to be reproduced and stores the dynamic range in the memory 53. However, in a case where information related to performance of a monitor included in the display devices 3 expresses SDR, the setting unit 82 sets SDR as a dynamic range of a screen to be reproduced and stores the dynamic range in the memory 53 regardless of initial_dynamic_range.

Also, the setting unit 82 sets resolution expressed by initial_HAVi_configuration_id of TerminalInfo as resolution of the screen to be reproduced and stores the resolution in the memory 53.

In step S34, according to control by the BD-J execution unit 51A based on the BDJO file, the disk drive 52 reads a JAR file of a title to be reproduced from the optical disk 11 and outputs the file to the BD-J execution unit 51A.

In step S35, according to a BD-J file included in the JAR file, the setting unit 82 of the BD-J execution unit 51A determines whether to change a dynamic range of the screen to be reproduced. More specifically, the setting unit 82 determines whether a current execution object of the BD-J file is setPreference(DynamicRange, HDRProperty#HDR, REQUIRED) or setPreference(DynamicRange, HDRProperty#SDR, REQUIRED).

In a case where the current execution object of the BD-J file is setPreference(DynamicRange, HDRProperty#HDR, REQUIRED) or setPreference(DynamicRange, HDRProperty#SDR, REQUIRED), the setting unit 82 determines to change the dynamic range of the screen to be reproduced. Then, the processing proceeds to step S36.

In step S36, the setting unit 82 changes the dynamic range of the screen to be reproduced by executing the current execution object of the BD-J file.

More specifically, the setting unit 82 changes the dynamic range stored in the memory 53 into HDR in a case where the current execution object of the BD-J file is setPreference(DynamicRange,HDRProperty#HDR,REQUIRED). On the other hand, in a case where the current execution object of the BD-J file is setPreference(DynamicRange, HDRProperty#SDR,REQUIRED), the setting unit 82 changes the dynamic range stored in the memory 53 into SDR. However, in a case where a monitor included in the display device 3 is an SDR monitor, the setting unit 82 does not change the dynamic range of the screen to be reproduced. After execution of the current execution object of the BD-J file, a next description becomes a current, execution object, and the processing proceeds to step S37.

On the other hand, in a case where the current execution object of the BD-J file is not setPreference(DynamicRange, HDRProperty#HDR,REQUIRED) or setPreference(DynamicRange,HDRProperty#SDR,REQUIRED), the setting unit 82 determines in step S35 not to change the dynamic range of the screen to be reproduced. Then, the processing proceeds to step S37.

In step S37, according to the BD-J file, the setting unit 82 determines whether to change resolution of the screen to be reproduced. More specifically, the setting unit 82 determines whether the current execution object of the BD-J file is setPreference for setting resolution.

In a case where the current execution object of the BD-J file is setPreference for setting resolution, the setting unit 82 determines to change the resolution of the screen to be reproduced. Then, the processing proceeds to step S38.

In step S38, the setting unit 82 changes the resolution of the screen to be reproduced by executing the current execution object of the BD-J file. After the resolution is changed, a next description becomes a current execution object and the processing proceeds to step S39.

On the other hand, in a case where the current execution object of the BD-J file is not setPreference for setting resolution, the BD-J execution unit 51A determines in step S37 not to change the resolution of the screen to be reproduced. Then, the processing proceeds to step S39.

In step S39, according to control by the BD-J execution unit 51A that executes the current execution object, the disk drive 52 reads PlayList and Clip Information of a reproduction object from the optical disk 11 and outputs these to the BD-J execution unit 51A. The BD-J execution unit 51A controls reproduction of an AV stream on the basis of PlayList and Clip Information that are supplied from the disk drive 52. Then, the BD-J execution unit 51A changes the current execution object of the BD-J file to a next description.

In step S40, according to control by the BD-J execution unit 51A, the disk drive 52 reads an AV stream, to be reproduced from the optical disk 11 and outputs the AV stream to the separation unit 57.

In step S41, the separation unit 57 separates an AV stream of a main video in SDR and an AV stream of a main video in HDR from, the AV stream supplied from the disk drive 52. The separation unit 57 outputs the separated AV stream of the main video in SDR and AV stream of the main video in HDR to the video decoder 58.

In step S42, according to a description of "getConfigurations( ).getPreferenceObject(DynamicRange)" that is the current, execution object of the BD-J file, the acquisition unit 81 of the BD-J execution unit 51A (FIG. 8) acquires org.blurayx.uhd.ui#HDRProperty#HDR or org.blurayx.uhd.ui#HDRProperty#SDR expressing a dynamic range of the screen to be reproduced which dynamic range is stored in the memory 53. Then, a next description becomes a current execution object of the BD-J file.

Then, according to a description for acquiring resolution which description is the current execution object of the BD-J file, the acquisition unit 81 acquires information expressing resolution of the screen to be reproduced, which information is stored in the memory 53, and supplies the information to the graphics processing unit 59.

In step S43, the acquisition unit 81 determines whether a dynamic range expressed by acquired org.blurayx.uhd.ui#HDRProperty#HDR or org.blurayx.uhd.ui#HDRProperty#SDR is HDR. In a case where it is determined in step S43 that the dynamic range is HDR, the acquisition unit 81 supplies HDR to the video decoder 58 and the graphics processing unit 59 and makes the processing proceed to step S44.

In step S44, on the basis of HDR supplied from the acquisition unit 81, the video decoder 58 decodes the AV stream of the main video in HDR, which AV stream is supplied from the separation unit 57, and outputs a main video in HDR which video is acquired as a result thereof to the synthesizing unit 60. In step S45, on the basis of HDR supplied from the acquisition unit 81, the graphics processing unit 59 generates graphics in HDR in resolution stored in the memory 53 and outputs the graphics to the synthesizing unit 60.

In step S46, the synthesizing unit 60 synthesizes the main video in HDR, which video is supplied from the video decoder 58, and the graphics in HDR which graphics is supplied from the graphics processing unit 59. In step S47, the synthesizing unit 60 outputs an image in HDR, which is acquired as a result of the synthesizing, to the display device 3 through the HDMI communication unit 61 and makes the processing proceed to step S52.

On the other hand, in a case where it is determined in step S43 that, the dynamic range is not HDR, that is, in a case where the dynamic range is SDR, the acquisition unit 81 supplies SDR to the video decoder 58 and the graphics processing unit 59 and makes the processing proceed to step S48.

In step S48, on the basis of SDR supplied from the acquisition unit 81, the video decoder 58 decodes the AV stream, of the main video in SDR, which AV stream is supplied from the separation unit 57, and outputs a main video in SDR which video is acquired as a result thereof to the synthesizing unit 60. In step S49, on the basis of SDR supplied from the acquisition unit 81, the graphics processing unit 59 generates graphics in SDR in resolution stored in the memory 53 and outputs the graphics to the synthesizing unit 60.

In step S50, the synthesizing unit 60 synthesizes the main video in SDR, which video is supplied from the video decoder 53, and the graphics in SDR which graphics is supplied, from the graphics processing unit 59. In step S51, the synthesizing unit 60 outputs an image in SDR, which image is acquired as a result of the synthesizing, to the display device 3 through the HDMI communication unit 61 and makes the processing proceed to step S52.

In step S52, the BD-J execution unit 51A determines whether the execution of the BD-J file is over, that is, whether the last description of the BD-J file becomes an execution object. In a case where it is determined in step S52 that the execution of the BD-J file is not over, a next description becomes a current execution object of the BD-J file and the processing returns to step S35. Then, the processing in step S35 to S52 is repeated until the execution of the BD-J file is over.

On the other hand, in a case where it is determined in step S52 that the execution of the BD-J file is over, the processing is ended.

Note that in the reproduction processing in FIG. 9, in the BD-J file, a description for instructing to change a dynamic range or resolution is made before a description for instructing reproduction corresponding to PlayList and a description for instructing acquisition of a dynamic range or resolution is made after the description for instructing reproduction corresponding to PlayList.

For example, in a case, where an AV stream of a main video in HDR of a main program of a movie is reproduced after reproduction of an AV stream of a main video in SDR of a movie trailer, "getConfigurations( ), get PreferenceObject(DynamicRange)" and a description for instructing acquisition of resolution are made after a description for instructing reproduction corresponding to PlayList of the trailer in a BD-J file. Subsequently, setPreference(DynamicRange,HDRProperty#HDR,REQUIRED) is described, a description for instructing reproduction corresponding to PlayList of the main program is made, and "getConfigurations( ).getPreferenceObject(DynamicRange)" and a description for acquiring resolution are made. Also, in a case where initial_dynamic_range expresses HDR, in a BD-J file, setPreference(DynamicRange,HDRProperty#SDR,REQUIRED) is described before the description for instructing reproduction corresponding to PlayList of the trailer.

However, a position of a description for instructing changing and acquisition of a dynamic range or resolution of a screen to be reproduced is not limited to this and can be a position intended by an author of content.

As described above, the reproducing device 2 can set a dynamic range or resolution of a screen to be reproduced and can generate an image in the set dynamic range or resolution. Accordingly, the reproducing device 2 can switch a dynamic range or resolution of a screen to be reproduced.

Figure 10:
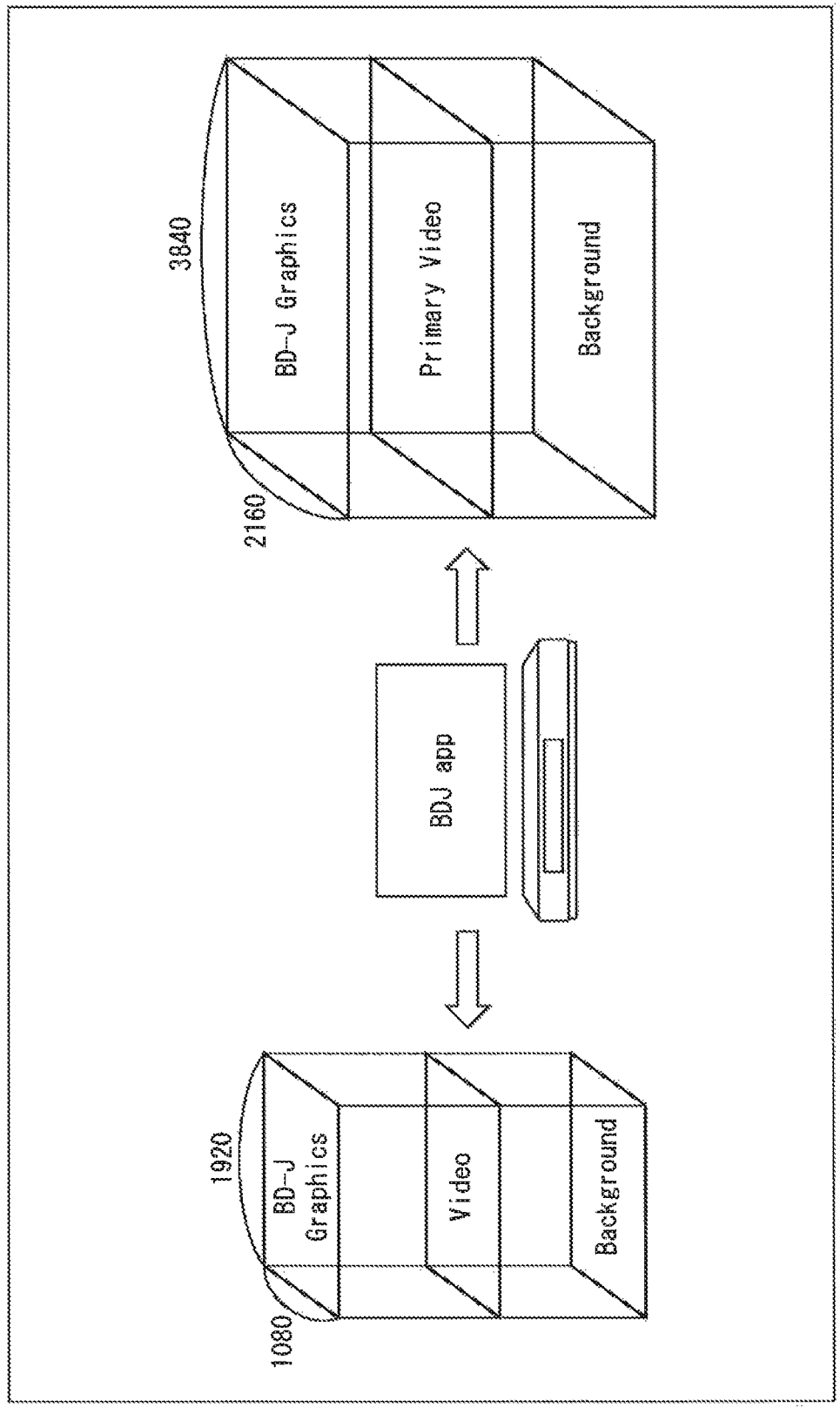
FIG. 10 is a view for describing switching of resolution in a first embodiment.

For example, as illustrated in FIG. 10, by executing a description using a class of API of BD-J, the reproducing device 2 can generate graphics (BD-J Graphics) and a background image (Background) in 2 k resolution of 1920×1080, which is the same with resolution of a main video (Video), or can generate graphics and a background image in 4 k resolution of 3840×2160.

Second Embodiment

Outline of Second Embodiment

Figure 11:
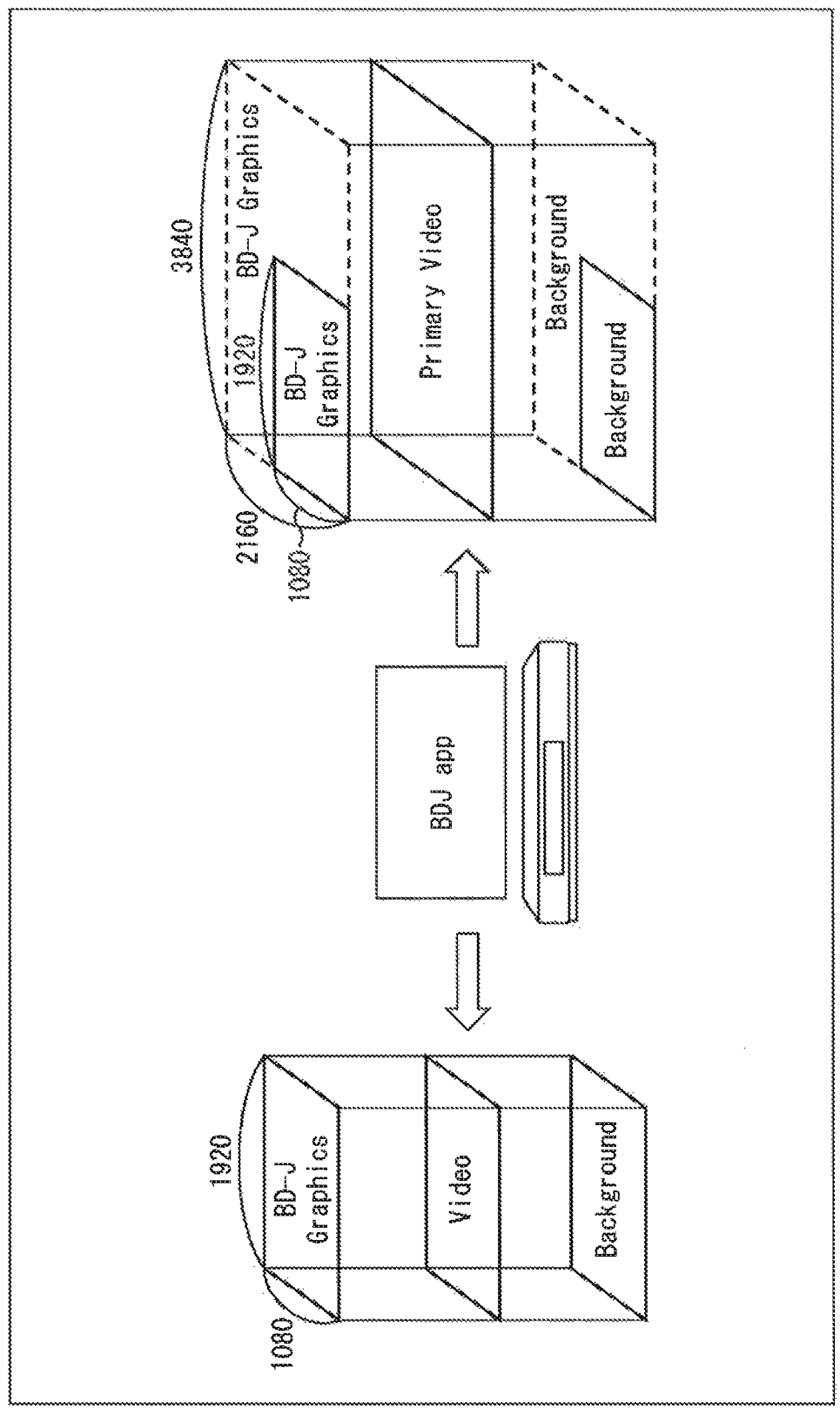
FIG. 11 is a view for describing an outline of a second embodiment of a recording/reproducing system, to which the present disclosure is applied.

FIG. 11 is a view for describing an outline of a second embodiment of a recording/reproducing system to which the present disclosure is applied.

As illustrated in FIG. 11, in the second embodiment, a reproducing device generates graphics and a background image in 2 k resolution of 1920×1080 regardless of resolution of a screen to be reproduced. Then, in a case where the resolution of the screen to be reproduced is resolution other than the 2 k resolution, the reproducing device converts the generated graphics and background image in the 2 k resolution into the resolution of the screen to be reproduced. In an example in FIG. 11, resolution of a screen to be reproduced is 4 k resolution of 3840×2160. The reproducing device converts resolution of generated graphics and background image in 2 k resolution into the 4 k resolution.

Note that since a configuration of the second embodiment of the recording/reproducing system to which the present disclosure is applied is the same with the configuration of the recording/reproducing system in FIG. 1 except for a configuration of the reproducing device, only the reproducing device will be described in the following.

Configuration Example of Reproducing Device

Figure 12:
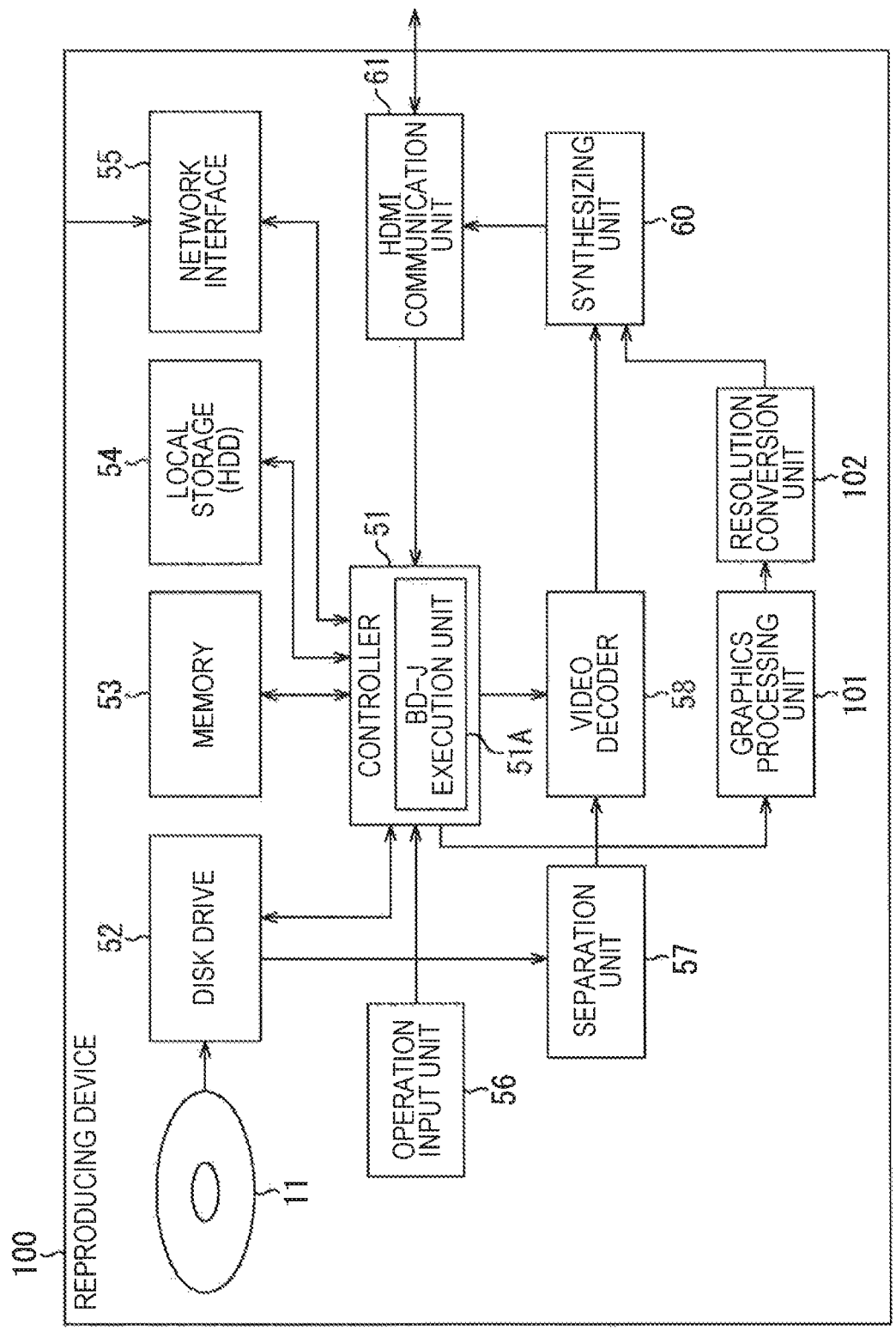
FIG. 12 is a block diagram illustrating a configuration example of a reproducing device in the second embodiment of the recording/reproducing system to which the present disclosure is applied.

FIG. 12 is a block diagram illustrating a configuration example of the reproducing device of the second embodiment of the recording/reproducing system to which the present disclosure is applied.

The same sign is assigned to a configuration, which is the same with the configuration in FIG. 7, in the configuration illustrated in FIG. 12. An overlapped description is arbitrarily omitted.

A configuration of a reproducing device 100 in FIG. 12 is different from the configuration of the reproducing device 2 in FIG. 7 in a point that a graphics processing unit 101 is provided instead of the graphics processing unit 59 and that a resolution conversion unit 102 is newly provided.

The graphics processing unit 101 of the reproducing device 100 generates graphics in 2 k resolution in a currently-set dynamic range of a screen to be reproduced according to control by a BD-J execution unit 51A. The graphics processing unit 101 supplies the generated graphics in 2 k resolution in SDR or HDR and currently-set resolution of the screen to be reproduced to the resolution conversion unit 102.

The resolution conversion unit 102 converts the resolution of the graphics in the 2 k resolution in SDR or HDR, which graphics is supplied from the graphics processing unit 101, into the currently-set resolution of the screen to be reproduced. The resolution conversion unit 102 supplies, to a synthesizing unit 60, graphics in SDR or HDR in the currently-set resolution of the screen to be reproduced which graphics is acquired as a result of that.

Description of Processing by Reproducing Device

Figure 13:
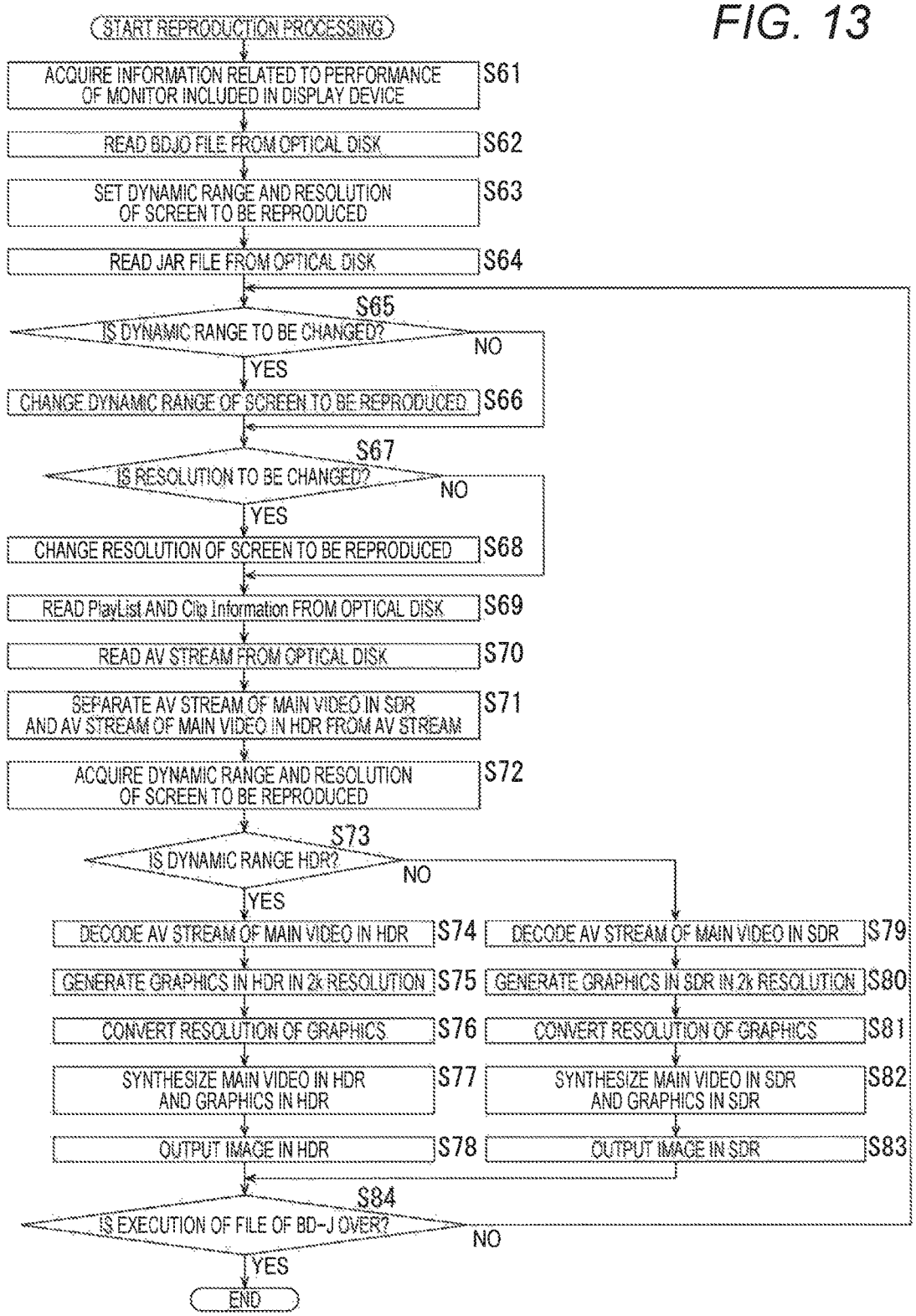
FIG. 13 is a flowchart for describing reproduction processing by the reproducing device in FIG. 12.
Figure 14:
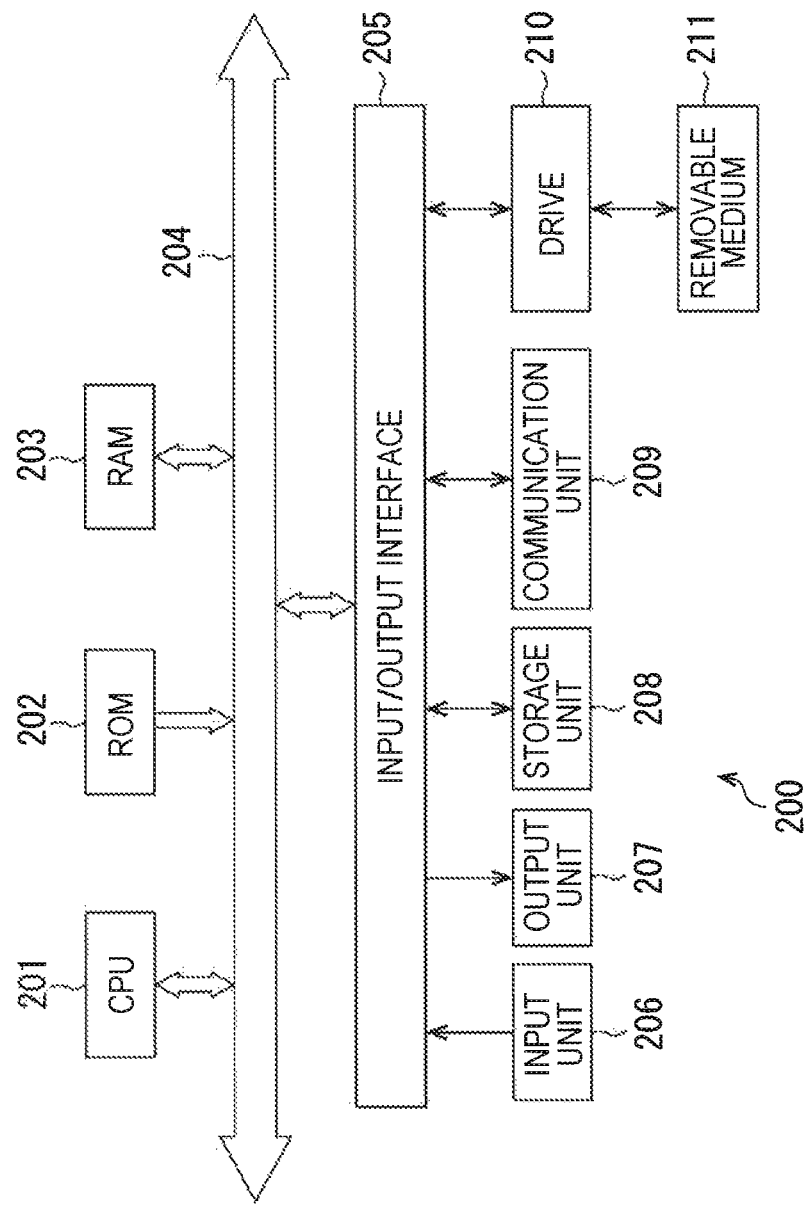
FIG. 14 is a block diagram illustrating a configuration example of hardware of a computer.

FIG. 13 is a flowchart for describing reproduction processing by the reproducing device 100 in FIG. 12.

Since processing in step S61 to S74 in FIG. 13 is similar to the processing in step S31 to S44 in FIG. 3, a description thereof is omitted.

In step S75, the graphics processing unit 101 generates graphics in HDR in the 2 k resolution. The graphics processing unit 101 outputs the generated graphics in HDR in the 2 k resolution and resolution of a screen to be reproduced, which resolution is supplied from the BD-J execution unit 51A, to the resolution conversion unit 102.

In step S76, the resolution conversion unit 102 converts resolution of the graphics in HDR in the 2 k resolution, which graphics is supplied from the graphics processing unit 101, into the resolution of the screen to be reproduced. The resolution conversion unit 102 supplies the graphics in HDR in the converted resolution of the screen to be reproduced to the synthesizing unit 60.

Since processing in step S77 to S79 is similar to the processing in step S46 to S48 in FIG. 9, a description thereof is omitted.

In step S80, the graphics processing unit 101 generates graphics in SDR in the 2 k resolution. The graphics processing unit 101 outputs the generated graphics in SDR in the 2 k resolution and resolution of a screen to be reproduced, which resolution stored in a memory 53, to the resolution conversion unit 102.

In step S81, the resolution conversion unit 102 converts the resolution of the graphics in SDR in the 2 k resolution, which graphics is supplied from the graphics processing unit 101, into the resolution of the screen to be reproduced. The resolution conversion unit 102 supplies the graphics in SDR in the converted resolution of the screen to be reproduced to the synthesizing unit 60.

Since processing in step S82 to S84 is similar to the processing in step S50 to S52 in FIG. 9, a description thereof is omitted.

Third Embodiment

Description of Computer to which Present Disclosure is Applied

The above-described series of processing can be executed by hardware or by software. In a case where the series of processing is executed by software, a program included in the software is installed into a computer. Here, for example, the computer includes a computer embedded in special hardware, a general personal computer that can execute various functions by installation of various programs, and the like.

FIG. 14 is a block diagram illustrating a configuration example of hardware of a computer to execute the above-described series of processing by a program.

In a computer 200, a central processing unit (CPU) 201, a read only memory (ROM) 202, and a random access memory (RAM) 203 are connected to each other by a bus 204.

To the bus 204, an input/output interface 205 is further connected. To the input/output interface 205, an input unit 206, an output unit 207, a storage unit 208, a communication unit 209, and a drive 210 are connected.

The input unit 206 includes a keyboard, a mouse, a microphone, or the like. The output unit 207 includes a display a speaker, or the like. The storage unit 208 includes a hard disk, a nonvolatile memory, or the like. The communication unit 203 includes a network interface or the like. The drive 210 drives a removable medium 211 such as a magnetic, disk, an optical disk, a magneto optical disk, or a semiconductor memory.

In the computer 200 configured in the above manner, for example, the CPU 201 loads a program stored in the storage unit 208 into the RAM 203 through the input/output interface 205 and the bus 204 and executes the program, whereby the above-described series of processing is performed.

For example, the program executed by the computer 200 (CPU 201) can be recorded in the removable medium 211, which functions as a package medium or the like, when being provided. Also, the program can be provided through a wired or wireless transmission medium such as a local area network, the Internet, or a digital satellite broadcast.

In the computer 200, the program can be installed into the storage unit 208 through the input/output interface 205 by mounting of the removable medium 211 to the drive 210. Also, the program can be received in the communication unit 209 through a wired or wireless transmission medium and can be installed into the storage unit 208. Alternatively, the program can be previously installed in the ROM 202 or the storage unit 208.

Note that a program executed by the computer 200 may be a program in which processing is performed in time series in order described in the present description or may be a program in which processing is performed in parallel or at necessary timing such as at performance of a call.

Also, in the present description, a system means an aggregation of a plurality of components (device, module (part), and the like) and all components are not necessarily in the same housing. Thus, both of a plurality of devices, which is housed in different, housings and is connected to each other through a network, and one device in which a plurality of modules is housed in one housing are systems.

An effect described in the present description is just an example and is not the limitation. There may be a different effect.

Also, an embodiment of the present disclosure is not limited to the above-described embodiments and various modifications can be made within the spirit and the scope of the present disclosure.

For example, in each of the first to third embodiments, there are two kinds of dynamic ranges that are SDR and HDR but there may be three or more kinds thereof. Also, in each of the first, to third embodiments, 4 k resolution can be set as resolution. However, different ultra high definition (UHD) such as 8 k resolution can be set.

Also, contents can be provided through a broadcast wave or a network. In this case, the present disclosure can be applied to a set-top box or a television receiver that receives a broadcast wave or to a personal computer or the like that transmits/receives data through a network.

Note that the present disclosure may include the following configuration.

(1)
An information processing device including: a setting unit, configured to set a dynamic range of an image to be reproduced; and a generation unit configured to generate the image to be reproduced in the dynamic range set by the setting unit.

(2)
The information processing device according to (1), wherein the setting unit acquires and sets an initial value of the dynamic range of the image to be reproduced.

(3)
The information processing device according to (1) or (2), wherein the setting unit acquires and sets a set value of the dynamic range of the image to be reproduced.

(4)
The information processing device according to (3), wherein the setting unit sets the set value by executing Blu-ray Disc Java (BD-J) using a class of BD-J which class instructs setting of the set value.

(5)
The information processing device according to (4), wherein the class has a function of an HGraphicsConfigurationTemplate class.

(6)
The information processing device according to any one of (1) to (5), further including an acquisition unit configured to acquire the dynamic range set by the setting unit.

(7)
The information processing device according to (6), wherein the acquisition unit acquires the dynamic range in expression of a class of Blu-ray Disc Java (BD-J) which class expresses a plurality of dynamic ranges.

(8)
The information processing device according to (7), wherein the plurality of dynamic ranges is a standard dynamic range (SDR) and a high dynamic range (HDR).

(9)
The information processing device according to any-one of (1) to (8), wherein the setting unit sets resolution of the image to be reproduced to 4 k resolution.

(10)
The information processing device according to (9), wherein the generation unit generates the image to be reproduced in the dynamic range and the 4 k resolution that are set by the setting unit.

(11)
The information processing device according to (9), further including a resolution conversion unit configured to convert the resolution of the image to be reproduced, wherein the generation unit generates the image to be reproduced in the dynamic range, which is set by the setting unit, and in 2 k resolution, and the resolution conversion unit converts the 2 k resolution of the image to be reproduced which image is generated by the generation unit into the 4 k resolution.

(12)
An information processing method by an information processing device, the method including: a setting step of setting a dynamic range of an image to be reproduced; and a generating step of generating the image to be reproduced in the dynamic range set by processing in the setting step.

(13)
A program that causes a computer to function as a setting unit configured to set a dynamic range of an image to be reproduced, and a generation unit configured to generate the image to be reproduced in the dynamic range set by the setting unit.

(14)
A recording medium that records information instructing setting of a dynamic, range of an image to be reproduced, that is mounted to an information processing device, that is reproduced, and that causes the information processing device, which acquires the information, to set the dynamic range of the image to be reproduced and to generate the image to be reproduced in the set dynamic range.

(15)
An information processing device including: a generation unit configured to generate a file including information instructing setting of a dynamic range of an image to be reproduced.

REFERENCE SIGNS LIST

2 Reproducing device
58 Video decoder
59 Graphics processing unit
81 Acquisition unit
82 Setting unit
100 Reproducing device
101 Graphics processing unit
102 Resolution conversion unit

The invention claimed is:

1. An information processing device comprising:
a setting unit configured to set a dynamic range of an image to be reproduced by executing Blu-ray Disc Java (BD-J) using a class of BD-J which class instructs setting of the set dynamic range; and
a generation unit configured to generate the image to be reproduced in the dynamic range set by the setting unit,
wherein the setting unit and the generation unit are each implemented via at least one processor.

2. The information processing device according to claim 1, wherein the setting unit acquires and sets an initial value of the dynamic range of the image to be reproduced.

3. The information processing device according to claim 1, wherein the setting unit acquires and sets a set value of the dynamic range of the image to be reproduced.

4. The information processing device according to claim 1, wherein the class has a function of an HGraphicsConfigurationTemplate class.

5. The information processing device according to claim 1, further comprising:
an acquisition unit configured to acquire the dynamic range set by the setting unit,
wherein the acquisition unit is implemented via at least one processor.

6. The information processing device according to claim 5, wherein the acquisition unit acquires the dynamic range in expression of a class of Blu-ray Disc Java (BD-J) which class expresses a plurality of dynamic ranges.

7. The information processing device according to claim 6, wherein the plurality of dynamic ranges is a standard dynamic range (SDR) and a high dynamic range (HDR).

8. The information processing device according to claim 1, wherein the setting unit sets resolution of the image to be reproduced to 4 k resolution.

9. The information processing device according to claim 8, wherein the generation unit generates the image to be reproduced in the dynamic range and the 4 k resolution that are set by the setting unit.

10. The information processing device according to claim 8, further comprising:
a resolution conversion unit configured to convert the resolution of the image to be reproduced,
wherein the generation unit generates the image to be reproduced in the dynamic range, which is set by the setting unit, and in 2 k resolution,
wherein the resolution conversion unit converts the 2 k resolution of the image to be reproduced which image is generated by the generation unit into the 4 k resolution, and
wherein the resolution conversion unit is implemented via at least one processor.

11. An information processing method by an information processing device, the method comprising:
setting a dynamic range of an image to be reproduced by executing Blu-ray Disc Java (BD-J) using a class of BD-J which class instructs setting of the set dynamic range; and
generating the image to be reproduced in the dynamic range.

12. A non-transitory computer-readable medium having embodied thereon a program, which when executed by a computer causes the computer to execute a method, the method comprising:
setting a dynamic range of an image to be reproduced by executing Blu-ray Disc Java (BD-J) using a class of BD-J which class instructs setting of the set dynamic range, and
generating the image to be reproduced in the dynamic range.

13. A non-transitory computer-readable medium having embodied thereon a program that records information, which when executed by a computer causes the computer to execute a method, the method comprising:
setting of a dynamic range of an image to be reproduced, that is mounted to an information processing device, that is reproduced; and
causing the information processing device, which acquires the information, to set the dynamic range of the image to be reproduced by executing Blu-ray Disc Java (BD-J) using a class of BD-J which class instructs setting of the set dynamic range and to generate the image to be reproduced in the set dynamic range.

14. An information processing device comprising:
memory; and
circuitry configured to:
generate a file including information instructing setting of a dynamic range of an image to be reproduced by executing Blu-ray Disc Java (BD-J) using a class of BD-J which class instructs setting of the set dynamic range.

15. The information processing device according to claim 2, wherein the initial value is included in TerminalInfo of a BDJO file of the image to be reproduced.

* * * * *